United States Patent [19]

King

[11] Patent Number: 5,119,495

[45] Date of Patent: Jun. 2, 1992

[54] MINIMIZING HARDWARE PIPELINE BREAKS USING SOFTWARE SCHEDULING TECHNIQUES DURING COMPILATION

[75] Inventor: Stephen E. King, Phoenix, Ariz.

[73] Assignee: Bull HN Information Systems Inc., Billerica, Mass.

[21] Appl. No.: 454,222

[22] Filed: Dec. 21, 1989

[51] Int. Cl.⁵ .............................................. G06F 9/06
[52] U.S. Cl. ........................... 395/700; 364/DIG. 1; 364/231.8; 364/263.1; 364/263; 364/247.6; 364/259.2
[58] Field of Search ... 364/200 MS File, 900 MS File

[56] References Cited

U.S. PATENT DOCUMENTS 4,295,193  10/1981  Pomerene ........................... 364/200
4,493,027   1/1985  Katz et al. ........................... 364/200
4,965,724  10/1990  Utsumi et al. ....................... 364/200

*Primary Examiner*—Thomas M. Heckler
*Attorney, Agent, or Firm*—J. S. Solakian; J. H. Phillips

[57] ABSTRACT

A compiler module is disclosed which minimizes pipeline breaks by reordering object code instructions to avoid conflicts between closely grouped instructions to the extent possible. Representation of each object code instruction in a small sequential group is temporarily held in a buffer and is assigned a pair of Attribute Words. Potential conflicts which a newly called instruction may have with those instructions already in the buffer are ascertained by logically AND-ing its Attribute Word with those of the other instructions and examining the result. If a conflict does exist, an attempt is made to resolve it by determining if the conflicting instruction already in the buffer can be moved ahead of one or more other instructions in the buffer such that the conflict is eliminated or minimized. This procedure involves a comparison of the Attribute Words of the candidate instruction to be moved, $I_m$, with the other instructions in the buffer. If movement of the conflicting instruction is possible and will resolve or minimize the conflict, the instructions in the buffer are reordered as appropriate.

6 Claims, 4 Drawing Sheets

|          | t0  | t1  | t2  | t3  | t4  | t5  | t6  | t7  | t8  | t9  |
|----------|-----|-----|-----|-----|-----|-----|-----|-----|-----|-----|
| "FETCH"  | I1  | I2  | I3  | I4  | **  | **  | I5  | I6  | I7  | I8 → |
| "ADDRESS"| --  | I1  | I2  | I3  | **  | **  | I4  | I5  | I6  | I7 → |
| "CACHE"  | --  | --  | I1  | I2  | I3  | **  | **  | I4  | I5  | I6 → |
| "EXECUTE"| --  | --  | --  | I1  | I2  | I3  | **  | **  | I4  | I5 → |

|          | t0  | t1  | t2  | t3  | t4  | t5  | t6  | t7  | t8  | t9  |
|----------|-----|-----|-----|-----|-----|-----|-----|-----|-----|-----|
| "FETCH"  | I3  | I1  | I2  | I4  | I5  | I6  | I7  | I8  | I9  | I10 → |
| "ADDRESS"| --  | I3  | I1  | I2  | I4  | I5  | I6  | I7  | I8  | I9 → |
| "CACHE"  | --  | --  | I3  | I1  | I2  | I4  | I5  | I6  | I7  | I8 → |
| "EXECUTE"| --  | --  | --  | I3  | I1  | I2  | I4  | I5  | I6  | I7 → |

INSTRUCTION TABLE ATTRIBUTE WORD

FIG. 3

WORD 1 (ADDRESS/USE ATTRIBUTES)

FIG. 4

WORD 2 (MODIFY/SPECIAL ATTRIBUTES)

FIG. 5

MINIMIZING HARDWARE PIPELINE BREAKS USING SOFTWARE SCHEDULING TECHNIQUES DURING COMPILATION

FIELD OF THE INVENTION

This invention relates to the art of computer programming, particularly to compilers and more specifically yet to a compiler which schedules instructions to minimize pipeline breaks.

BACKGROUND OF THE INVENTION

Computer programs are typically written in a high level language, such as "C", Fortran, Pascal, Basic, etc., which has more readily accessible meaning to the original programmer (or to another seeking to understand the program structure) than does a listing of a sequence of machine level instructions. The program expressed in the high level language is known as "source code". However, source code will not execute directly and therefore must either be interpreted, statement by statement, into executable code as a program is run or first compiled into "object code" (which is meaningful on the given hardware employing the given operating system) and then run as object code. The compilation is performed by a special purpose "compiler" program which has an awareness of the architecture: of the computer system with which the object code will be used and can therefore translate each source code statement into one or more system specific object code instructions. Those skilled in the art will understand that executing compiled object code is very much faster than executing source code through an interpreter, and most commercial code is provided only in compiled form.

As faster operation of computers has been sought, numerous hardware/firmware features have been employed to achieve that purpose. One widely incorporated feature directed to increasing the speed of operation is pipelining in which the various stages of execution of a series of consecutive machine level instructions are undertaken simultaneously. Thus, during a given time increment, a first stage of a fourth (in order of execution) instruction may be undertaken while a second stage of a third instruction, a third stage of a second instruction and a fourth stage of a first instruction are all undertaken simultaneously.

This procedure dramatically increases the apparent speed of operation of a computer system. However, there are instances in which conflicts arise among the sequential instructions which can bring about a pipeline "break", i.e., a need to interrupt the smooth interleave of the succeeding instructions in order to wait out the conflict. As an elementary example, if, in undertaking the first stage of a fourth instruction, a given register is used for an operand address and the same register is simultaneously being altered by undertaking the second stage of the third instruction, a conflict exists, and the first stage of the fourth instruction must be postponed, thereby resulting in a pipeline break and a consequent decrease in the apparent speed of execution. The present invention directly addresses, and serves to minimize, the problem of software breaks in compiled object code employed in a computer processor employing pipelined architecture.

OBJECTS OF THE INVENTION

It is therefore a broad object of this invention to provide an improved compiler.

It is a more specific object of this invention to provide a compiler module which selectively reorders closely sequenced object code instructions in order to minimize pipeline breaks.

SUMMARY OF THE INVENTION

Briefly, these and other objects of the invention are achieved by a compiler module in which representations of each object code instruction in a small sequential group temporarily held in a buffer is assigned a pair of Attribute Words developed from an Instruction Attribute Table as each enters the scheduling process. Potential conflicts which a new instruction may have with those instructions already in the buffer may be readily ascertained in a first sub-process by logically AND-ing its Attribute Words with those of the other instructions such that any response other than zero indicates a potential conflict. If no conflict exists, the oldest instruction in the buffer is sent to an object module, and the newest instruction is pushed into the buffer. However, if a conflict does exist, a second sub-process is undertaken to resolve the conflict, if and to the extent possible, by determining if the conflicting instruction already in the buffer can be moved ahead of one or more other instructions in the buffer such that the conflict is minimized or eliminated. This sub-process involves a comparison of the Attribute Words of the candidate instruction to be moved with the other instructions in the buffer. If movement of the conflicting instruction is possible and will resolve or minimize the conflict, the instructions in the buffer are reordered as appropriate, the oldest instruction is sent to the object module, and the new instruction is pushed into the buffer.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 3 illustrates an exemplary Instruction Table Attribute Word employed in the practice of the invention;

FIG. 4 illustrates an exemplary Address/Use attribute Word employed in the practice of the invention;

FIG. 5 illustrates an exemplary Modify/Special Attribute Word employed in the practice of the invention;

DETAILED DESCRIPTION OF THE INVENTION

In the description of the invention which follows, the exemplary environment chosen to illustrate the invention is a four-stage pipeline processor in which the fundamental word length is thirty-six bits. Those skilled in the art will understand that a given processor might include a pipeline of some other number of stages and/or a basic word of some other length. It will also be understood that different techniques can be employed to establish, keep track of and coordinate the functions of the various buffers, stacks, attribute words, etc., specific examples of which have been chosen for the purpose of illustrating the exemplary implementation of the invention.

Figures 1, 2, 8:
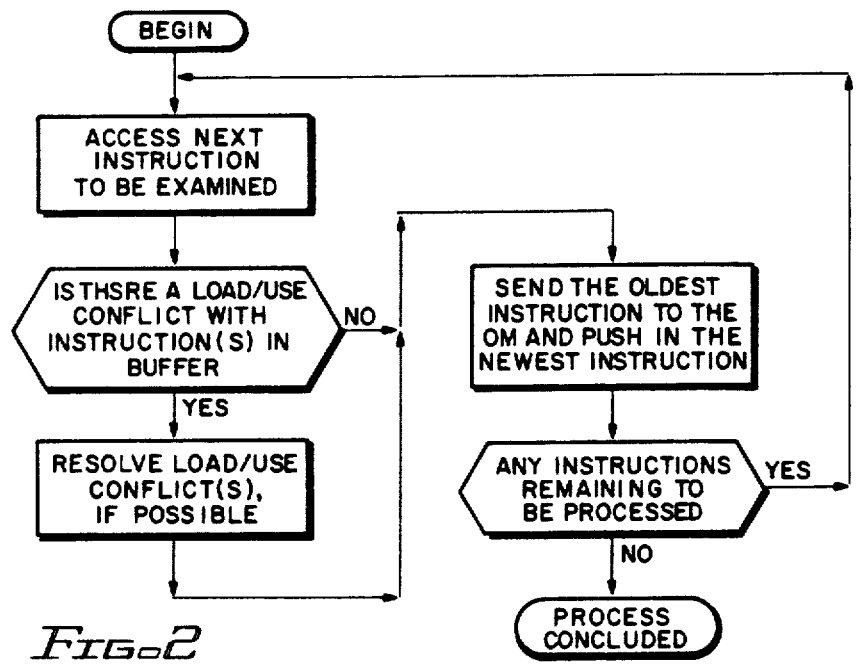
FIG. 1 is a tabular representation of instructions deployed in an exemplary four-stage pipeline under conditions which cause a pipeline break.
FIG. 2 is a high level flow chart of the subject invention.
FIG. 8 is a tabular representation similar to FIG. 1 in which instructions in the pipeline have been reordered according to the present invention to avoid a pipeline break.

Thus, attention is first directed to FIG. 1 in which it will be seen that the four pipeline stages of the example are: "fetch", "address", "cache" and "execution". During the "fetch" stage, the instruction itself is brought into the instruction decoding logic of the processor. During the "address" stage, any operand or other address required for execution of the instruction is developed. During the "cache" stage, any operand/data required from memory is fetched (typically from cache memory). And, during the "execution" stage, the actual execution of the instruction takes place.

Now, in FIG. 1, during t2 (merely as an example), while I3 is being fetched, an address component is being developed for I2, I1 is accessing cache memory or main memory as needed, and the next earlier instruction is being executed. Ideally, during t3, while I4 is being fetched, an address component would be developed for I3, I2 would access cache, and I1 would be executed. Then, during t4, I5 would be fetched, etc. But consider the situation in which I4 uses a register for an operand address that is being loaded by I3. I4 cannot proceed to the address stage of the pipeline until after t5 when the execution phase of I3 loads the register. The result is a pipeline break which must be waited out (as indicated by the double asterisks) with a corresponding decrease in system performance.

However, in the example, if I3 could be rescheduled ahead of I1 without introducing a new conflict, the pipeline break could be avoided or minimized, and this is the basis for the operation of the subject invention. FIG. 2 is a high level flow chart which sets forth the basic concept of rescheduling machine language instructions to avoid pipeline breaks. The basis as stated and shown in FIG. 2 is deceptively simple, but efficient decision-making processes have been elusive, and the decision-making processes of the present invention are among its important features.

The key to the decision making processes employed according to the present invention is the development of Attribute Words which are temporarily associated with each instruction as it brought into the scheduling process. These Attribute Words, in turn, are individually developed from information stored in an Instruction Attribute Table. Since each instruction (i.e., each one of the many instructions in the repertoire of a given computer processor) can reference and use an individual set of resources (such as registers and/or memory), an encoded description of the manner in which addressing can be carried out (addressing may implicitly use registers and/or memory), which registers are used, the manner in which registers are used, which registers are modified and the manner in which registers are modified and other relevant information can all be incorporated into the unique Instruction Table Attribute Word for a given instruction in the system repertoire.

An exemplary Instruction Table Attribute Word, which may be employed with a compiler preparing object code for a large scale computer system employing the Bull GCOS 8 Operating System, is illustrated in FIG. 3. As previously noted, each entry in the Instruction Attribute Table gives the attributes for an instruction in the system repertoire, and there will typically be as many entries in the Table as there are instructions in the repertoire. These attributes define the registers/memory a given instruction uses and in which contexts. In the example, the system attributes of interest are:

Addressing Attributes
  T = instruction can be tagged (bits 30–35)
  M = instruction can have a memory address
  AR = instruction can use an address register if bit 29 is on
Use Attributes (includes addressing attributes)
  X = uses index (in bits 24–26 of instruction)
  XD = uses X + 1 also
  E = uses exponent register
  A = uses A register
  Q = uses Q register
  G = uses general register (bits 0–3 of instruction)
  GD = uses G + 1
  R = uses general register (bits 32–35 of instruction)
  RD = uses R + 1
Modify Attributes
  X = modifies index (bits 24–26 of instruction)
  XD = modifies X + 1 also
  E = modifies exponent register
  A = modifies A register
  Q = modifies Q register
  G = modifies general register (bits 0–3 of instruction)
  GD = modifies G + 1
  R = modifies general register (bits 32–35 of instruction)
  RD = modifies R + 1
General Attributes
  TR = can transfer control
  SP = special (sreg, lreg, . . . )
  EI = eis type instruction
  VC = vector type instruction In FIG. 3, the format of the Instruction Table Attribute Word is:
  tra = transfer of control
  eis = multiword eis
  vec = multiword vector
  spc = special (lreg, sreg, . . . )
  n1, n2, n3 = 3-bit number designating type of eis/vec instruction An Instruction Buffer contains information representing instructions that are currently "in the buffer". The Instruction Buffer is conveniently implemented as a circular, FIFO stack of an appropriate length. (For the four-stage pipeline example, a length of five is appropriate, but not mandatory.) It may be conveniently managed by two indexes: TOPST which points to the last instruction put in the buffer and BOTST which points to the oldest instruction in the buffer. Thus, If TOPST equals BOTST, there is no item in the buffer. To place an item in the buffer, TOPST is incremented by 1. If TOPST exceeds the buffer length, then TOPST is reset to 0.

The Instruction Buffer contains several fields:
ISSA = instruction scheduling stack a (instruction)
ISSQ = instruction scheduling stack q (type of relocation)
ISSIC = location in memory of instruction
ISSATT = attributes of instruction (two words)

The formats of the Instruction Address/Use/Modify Attribute Words developed for each instruction brought into the Buffer are shown in FIGS. 4 and 5. Attribute Word 1 contains address and use attributes. Attribute Word 2 contains modify and special attributes. In Attribute Word 2:

tra = transfer instruction
   eis = eis instruction (mlr, mtm, ...)
   vec = vector instruction (vfad, ...)
   sp = special (lreg, sreg, ...)
   dsc = discriptor for vector or eis (vdsc, adsc9, ...)
   lst = two words used for lstou (annotator phase)
   mu = memory used
   mc = memory changed Consider now the following specific example of the manner in which the attribute words for a "Load A-Register" instruction being brought into the scheduling process are derived in the exemplary environment. The "LDA" instruction has, in addition to its opcode field, an operand field. Its function is to cause the information whose location is identified in the operand field to be fetched and placed into the A-Register. The operand can be:

immediate; e.g., LDA 7, DL = the constant 7

| | |
|---|---|
| immediate; e.g., LDA 7, DL = | the constant 7 |
| offset only; e.g., LDA A = | the value in location A |
| or LDA 12 = | the value in location 12 |
| indexed; e.g., LDA A, 7 = | the value from memory location (A + contents of index 7) |
| or LDA A,,0 = | the value from memory location A modified by information in Address Register 0 |

Now, the Instruction Table Attribute Word for the LDA instruction, expressed in octal and binary, respectively, is:

| 0 | 7 | 4 | 0 | 0 | 0 | 0 | 0 | 0 | 4 | 0 | 0 |
|---|---|---|---|---|---|---|---|---|---|---|---|
| 000 | 111 | 100 | 000 | 000 | 000 | 000 | 000 | 000 | 100 | 000 | 000 |

The meaning of the "1" settings in the various positions of the Instruction Table Attribute Word are as follows. In the second octal digit, value 7, the most significant binary digit indicates that index addressing is possible, the second binary digit indicates that memory usage is possible, and the least significant binary digit indicates that address register usage is possible. In the third octal digit, value 4, the most significant binary digit indicates that memory is used during execution, and in the tenth octal digit, value 4, the most significant binary digit indicates that the A-Register is changed during execution. From this information, the development of Attribute Words (expressed in octal) for exemplary LDA instructions to be examined for possible load/use conflicts with other instructions already in the Buffer.

| Instruction | Word 1 | Word 2 |
|---|---|---|
| LDA 5,DL | 000000 000000 (no address for immediate operand) | 000002 000000 (change A-Reg.) |
| LDA A | 000000 000000 | 000002 000000 |
| LDA A,1 | 000400 000000 (X1 used in address) | 000002 000000 |
| LDA A,,0 | 400000 000000 (AR0 used in address) | 000002 000000 |

Figure 6:
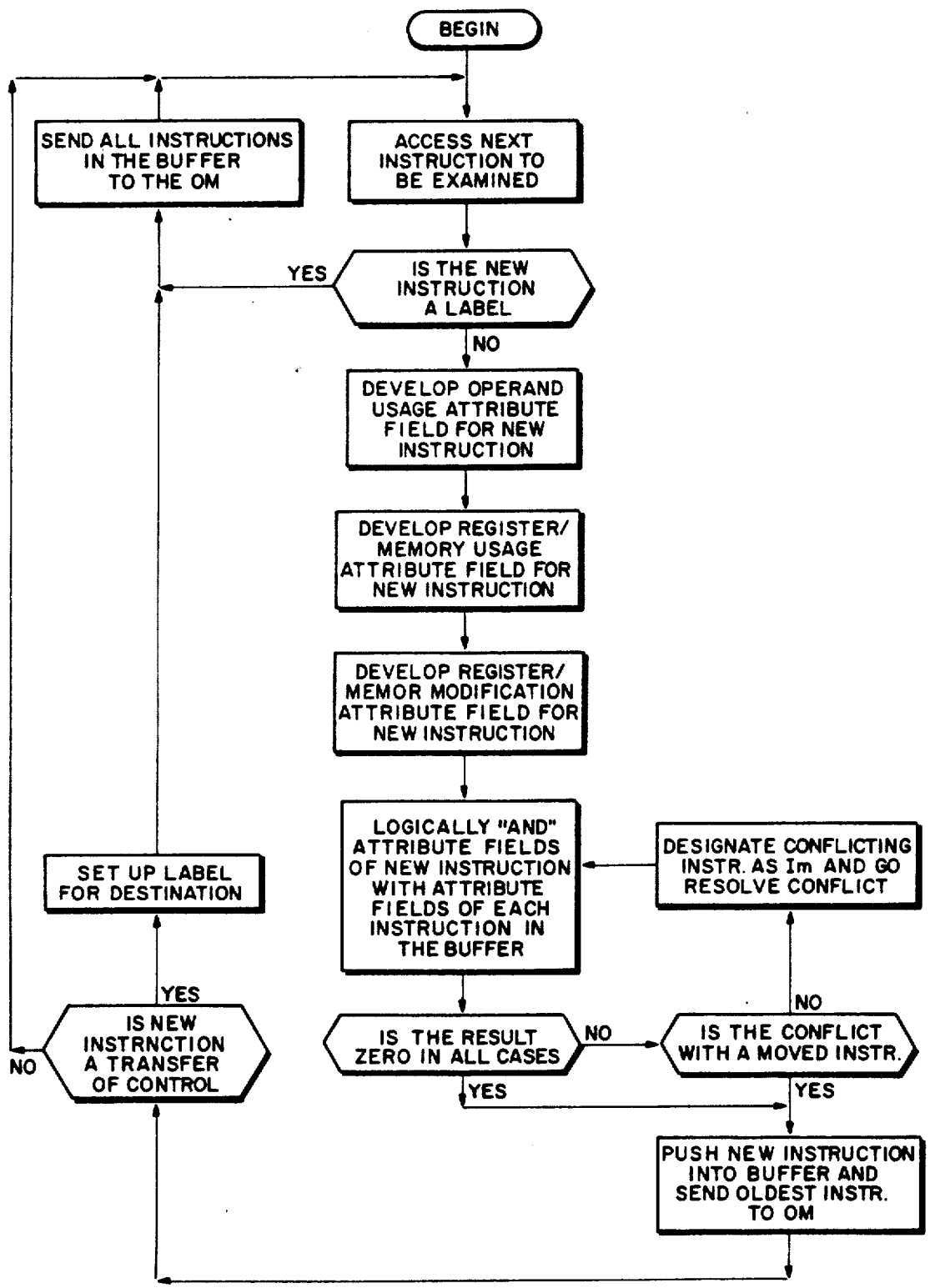
FIG. 6 is a more detailed flow chart particularly directed to a first sub-process component of the invention.

FIG. 6 is a flow chart more detailed than FIG. 2 in that the FIG. 2 block "IS THERE A LOAD/USE CONFLICT WITH INSTRUCTION(S) IN THE BUFFER?" is broken down into the sub-process steps necessary to make the broad decision. It may be noted at this point that, as will be discussed further below, an "instruction" may actually be a label which requires the Buffer to be flushed. Thus, it will be seen in FIG. 6 that a new instruction is first checked to determine if it is a label and, if so, all the instructions in the Buffer are sent to the object module, and another new instruction is called into the process. If the new instruction is not a label, an Operand Usage Attribute Field (Attribute Word 2 in the example), a Register/Memory Usage Field (first half of Attribute Word 1 in the example) and a Register/Memory Modification Field (second half of Attribute Word 2 in the example) are developed, for example, as previously described. (The order of development of these Attribute Fields is, of course, not important and can be carried out as may be convenient in a given system.)

Then, the actual test for conflicts is made by logically AND-ing the Attribute Fields (i.e., Attribute Words 1 and 2 in the example) of the new instruction with the Attribute Fields of the other instructions currently in the Buffer. A result of zero indicates that no conflict exists such that the oldest instruction in the Buffer may be taken from the bottom of the stack and sent to the object module and the new instruction placed on top of the stack. If the new instruction is not a transfer of control, the next instruction to be examined is called. However, if the new instruction is a transfer of control (e.g., an unconditional branch), a label is set up for the specified destination, and the Buffer is flushed before the next new instruction is called into the process.

If the result of the logical AND operation is non-zero, then a conflict exists, and an attempt is made to resolve it. If the conflict is with a moved instruction (indicating that at least one successful pass has already been made through the resolution process), then the flow may proceed as if the result had been zero because the effect of the pipeline break will have been minimized (which might have resulted in its complete elimination). However, if the conflict is not with a moved instruction indicating that further improvement is possible, the conflict resolution sub-process is continued.

Figure 7:
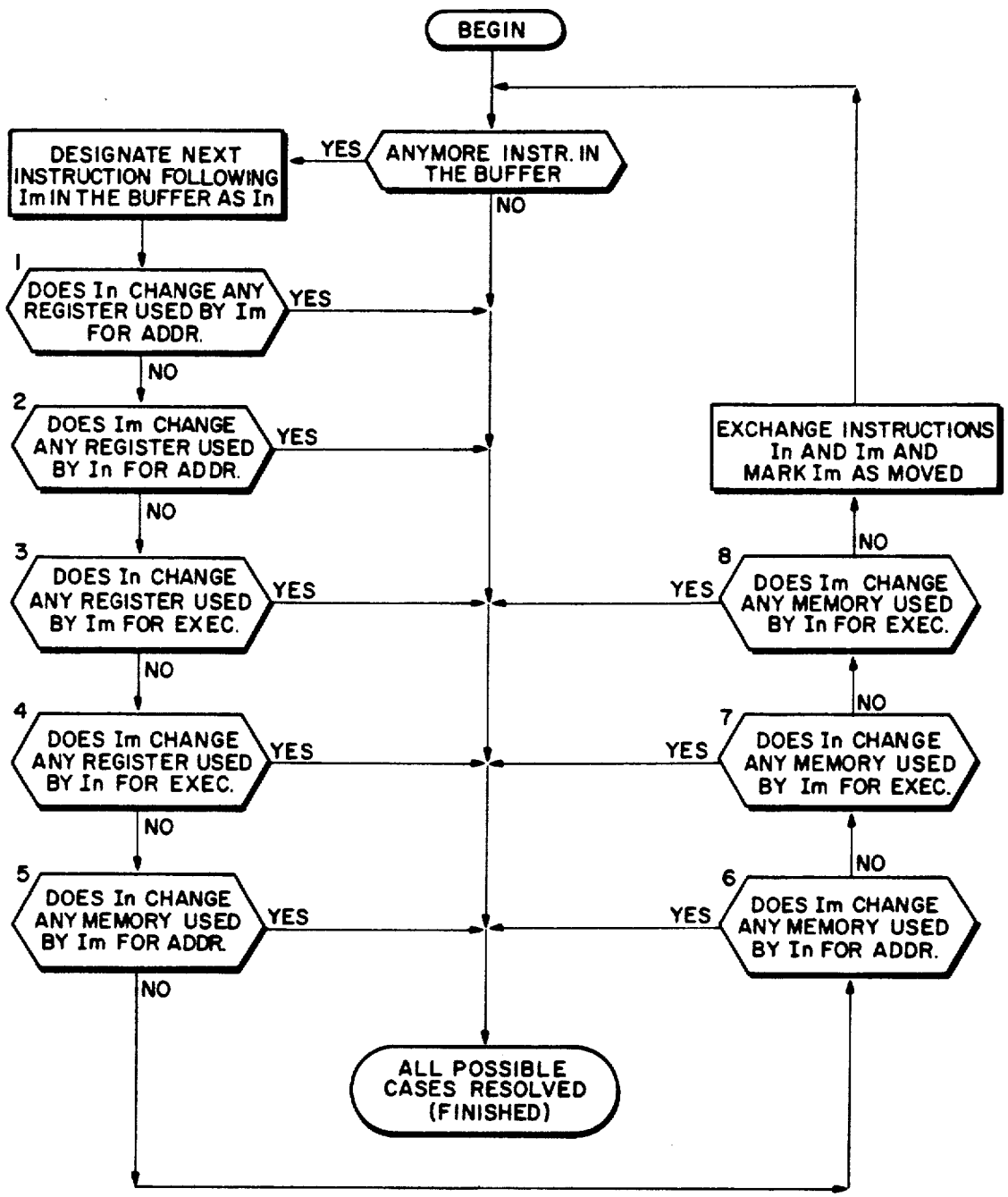
FIG. 7 is a more detailed flow chart particularly directed to a second sub-process component of the invention.

Considering now the resolution sub-process itself, FIG. 7 is a flow chart more detailed than FIG. 2 in that the FIG. 2 block "RESOLVE LOAD/USE CONFLICT(S) IF POSSIBLE" is broken down into the steps necessary to make the determination and to perform the conflict-resolving operations if available.

Slightly more precisely, FIG. 7 may also be considered the expansion of the FIG. 6 block "DESIGNATE NEWEST INSTR. AS $I_m$ AND GO RESOLVE CONFLICT". It is important to understand that, in the following discussion, $I_m$ is not the new instruction, but is an instruction already in the Buffer which is a candidate to be moved earlier in the sequence to resolve the conflict. Often, but not always, $I_m$ will be the instruction immediately preceding the new instruction until $I_m$ is moved.

In performing the analysis, a series of yes/no determinations are made vis-a-vis $I_m$ and each of the instructions currently ahead of it in the Buffer. Again, the order of the inquiries (and even the inquiries themselves) may be selected to be convenient and appropriate to a particular system environment. It has been found to be more efficient, and thus preferable, to make the several inquiries for a given instruction vis-a-vis $I_m$ serially as shown in FIG. 7 rather than adopting the readily apparent alternative of making a given inquiry for all the instructions in the Buffer ahead of $I_m$, moving to the next inquiry, etc. This preferred approach avoids the necessity of saving the points at which each test might have failed and also permits terminating the process at the earliest possible time if $I_m$ cannot be moved past an older instruction with which it is being correlated.

In the example, the first inquiry is whether the instruction in the Buffer next older than $I_m$ (designated $I_n$) changes any register used by $I_m$. This may be carried out by logically AND-ing the first half of Attribute Word 1 of $I_m$ with the second half of Attribute Word 1 of $I_n$. Any non-zero result will indicate that $I_m$ cannot be moved past the conflicting instruction, and the resolution process concluded. At this time, the sub-process will have minimized the effect of the pipeline break.

The second inquiry in the example is whether $I_m$ changes any register used by $I_n$ for addressing. This is accomplished by AND-ing the first half of Attribute Word 2 of $I_m$ with the first half of Attribute Word 1 of $I_n$.

The third inquiry in the example is whether $I_n$ changes any register changed by $I_m$ in execution. This is accomplished by AND-ing the second half of Attribute Word 2 of $I_m$ with the first half of Attribute Word 1 of $I_n$.

The fourth inquiry in the example is whether $I_m$ changes any register changed by $I_n$ in execution. This is accomplished by AND-ing the first half of Attribute Word 1 of $I_m$ with the first half of Attribute Word 1 of $I$.

The fifth inquiry in the example is whether $I_n$ changes any memory used by $I_m$ for addressing. If bit 35 of Attribute Word 2 for $I_n$ is not set to "1" (i.e., memory changed), this case does not occur, and further tests can be undertaken. If it is a "1", then a check can be made to determine if the addressing mode of instruction $I_m$ uses memory. If it does not, the flow may proceed to the next inquiry; if it does, a check is made to determine if the address of $I_m$ is distinctly different from the address if $I_n$. If this cannot be determined, then it must be assumed that $I_n$ changes memory that $I_m$ uses in addressing. Those skilled in the art will understand that there may be some simple cases in which it can be determined if two addresses are equal and thus permit a positive type of checking to be used.

The sixth inquiry in the example is whether $I_m$ changes any memory used by $I_n$ for addressing. If bit 35 of Attribute Word 2 for $I_m$ is not set to "1" (i.e., memory changed), this case does not occur, and further checks can be undertaken; however, if this bit is set to "1", then a check is made to determine if the addressing mode of $I_n$ uses memory. If it does not, the next inquiry is undertaken; if it does, a check is made to determine if the address of $I_n$ is distinctly different from the address for $I_m$. If this cannot be determined, then it must be assumed that $I_m$ changes memory that $I_n$ uses in addressing.

The seventh inquiry in the example is whether $I_n$ changes any memory used by $I_m$ during execution. If bit 35 of Attribute Word 2 for $I_n$ is not set to "1" or if bit 34 of Attribute Word 2 for $I_m$ is not set to "1", (which would indicate that memory is used), then the situation does not occur, and the next inquiry can be undertaken. If both bits are on, then the addresses of both instructions must be checked to determine if they are distinctly different. If that cannot be determined, it must be assumed that they are the same and that $I_m$ cannot be moved past $I_n$.

The eighth inquiry in the example is whether $I_m$ changes any memory used by $I_n$ during execution. If bit 35 of Attribute Word 2 for $I_m$ is not set to "1" or bit 34 of Attribute Word 2 for $I_n$ is not set to "1" (which would indicate that memory is used), then the situation does not occur, and the process can proceed. If both bits are on, then the addresses of both instructions must be checked to determine if they are distinctly different. If that cannot be determined, it must be assumed that they are the same and that $I_m$ cannot be moved past $I_n$.

If it is determined by this process that $I_m$ cannot be moved ahead of the immediately preceding instruction, the pipeline break has been minimized to the extent possible with the current instruction string. The next new instruction is then called for analysis. However, if it is determined that $I_m$ can be moved ahead of the immediately preceding instruction, the inquiry can optionally (but preferably) continue to see if it can be moved even further ahead to further minimize or even eliminate the pipeline break. This feature is shown in FIG. 7 in which it will be seen that a successful pass through all tests causes an exchange of $I_m$ and $I_n$ and an iteration of the sub-process after the next older instruction in the Buffer is designated as $I_n$. If there are no more older instructions in the Buffer, of course, all possible cases will have been resolved in the current context.

As shown in FIG. 6, when the earliest acceptable position for $I_m$ has been determined, the oldest instruction in the Buffer is sent to the object module and the new instruction is placed on top of the stack in the Buffer. The next new instruction is then called for analysis. After a break has been resolved and the new instruction has been pushed into the Buffer, a check is made to determine if the new instruction is a transfer of control. If so, the Buffer, including the transfer of control instruction, is flushed to the object module because it would be erroneous to move any instructions ahead of any transfer of control. (It will be seen that, in actual practice, the Buffer size changes from time to time. It can restart at length zero and, as instructions are processed, builds to a maximum size —five in the example—such that only then do instructions commence to be "pushed off" the stack to the object module by the inclusion of new instructions.) In addition, the destination of the transfer is examined, and, if it is within the current program and not to a prior location, the destination location is saved in a "label" (labels in this context are typically the destination of a transfer) table. This information is then available when the instruction is again called for processing.

Referring once again to FIG. 1 and also to FIG. 8, the result of a successful rescheduling according to the present invention can be appreciated. In FIG. 8, it is assumed as an example that it has been determined that $I_m$ (i.e., I3) can be safely moved ahead of I2 and I1, and that's as far as it can safely go. The result, as will be apparent from a comparison of FIGS. 1 and 8, is the complete elimination of the pipeline break and a consequent substantial increase in performance. In other instances, as discussed above, a given pipeline break may not be completely eliminated by application of the present invention, but it will be minimized which, in itself, effects an increase in apparent processor performance.

While the principles of the invention have now been made clear in an illustrative embodiment, there will be immediately obvious to those skilled in the art many modifications of structure, arrangement, proportions, order, etc. used in the practice of the invention which are particularly adapted for specific environments and operating requirements without departing from those principles.

What is claimed is:

1. A process for scheduling the order of instructions of a compiled program for use in a pipelined architecture processor to minimize pipeline breaks comprising the steps of:
   A) establishing an instruction buffer for receiving representations of new instructions to be processed with respect to representations of instructions already residing therein;
   B) if any instructions remain to be processed, calling a new instruction; else, conclude the process;
   C) establishing, for such new instruction to be processed, attribute fields providing information thereon with respect to its usage of memory and registers;
   D) logically comparing the attribute fields of the new instruction with the attribute fields of the instructions then represented in the buffer to identify the presence of any conflicts;
   E) if no conflicts are identified in step D), proceeding to step F);
   F) sending the oldest instruction represented in the buffer to an object module, pushing the representation of the new instruction into the buffer;
   G) returning to step B);
   H) if conflicts are identified in step D), proceeding to step I);
   I) designating the most recent instruction already in the buffer as $I_m$, a candidate to be moved to ar earlier position in the buffer;
   J) systematically comparing the attribute fields of $I_m$ with the attribute fields of a selected one, $I_n$, of the instructions represented in the buffer which holds an earlier position in the buffer than $I_m$ to determine if the positions in the buffer of $I_m$ and $I_n$ can be safely exchanged;
   K) if $I_m$ and $I_n$ can be safely exchanged, effecting the exchange and returning to step J) to determine if $I_m$ can be moved yet earlier in the buffer; and
   L) if $I_m$ and $I_n$ cannot be safely exchanged or if no instructions remain in the buffer for designation as $I_n$, proceeding to step F).

2. The process of claim 1 in which step C) is accomplished by accessing the contents of an instruction attribute table which contains an encoded description of the manner in which addressing can be carried out, which registers are used, the manner in which registers are used, which registers are modified and the manner in which registers are modified for each instruction in the repertoire of a given computer processor for which the scheduling process is to be applied.

3. The process of claim 2 in which, intermediate step G) and step B), there is included the following steps:
   M) determining if the new instruction just pushed into the buffer is a transfer of control;
   N) if the determination in step M) is that the new instruction is a transfer of control, flushing the buffer to the object module and then proceeding to step B); and
   O) if the determination in step M) is that the new instruction is not a transfer of control, proceeding to step B).

4. The process of claim 3 in which, during step N) a destination label is generated for reentry into the process at an appropriate later time.

5. The process of claim 1 in which, intermediate step G) and step B), there is included the following steps:
   M) determining if the new instruction just pushed into the buffer is a transfer of control;
   N) if the determination in step M) is that the new instruction is a transfer of control, flushing the buffer to the object module and then proceeding to step B); and
   O) if the determination in step M) is that the new instruction is not a transfer of control, proceeding to step B).

6. The process of claim 5 in which, during step N) a destination label is generated for reentry into the process at an appropriate later time.

* * * * *